US011482132B2

(12) United States Patent
Cruz

(10) Patent No.: US 11,482,132 B2
(45) Date of Patent: Oct. 25, 2022

(54) DEVICES AND METHODS FOR PROVIDING TACTILE FEEDBACK

(71) Applicant: Toyota Motor Engineering & Manufacturing North America, Inc., Erlanger, KY (US)

(72) Inventor: Carlo Cruz, Cincinnati, OH (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 472 days.

(21) Appl. No.: 15/421,912

(22) Filed: Feb. 1, 2017

(65) Prior Publication Data
US 2018/0218641 A1 Aug. 2, 2018

(51) Int. Cl.
*G09B 21/00* (2006.01)
*G06F 3/01* (2006.01)
*G06V 40/16* (2022.01)
*G06V 30/194* (2022.01)

(52) U.S. Cl.
CPC ........... *G09B 21/003* (2013.01); *G06F 3/016* (2013.01); *G06V 40/166* (2022.01); *G06V 40/174* (2022.01); *G06F 2203/011* (2013.01); *G06V 30/194* (2022.01)

(58) Field of Classification Search
CPC .... G09B 21/003; G06F 3/016; G06K 9/00255
USPC ....................................................... 434/114
See application file for complete search history.

(56) References Cited

U.S. PATENT DOCUMENTS

| 7,231,066 | B2* | 6/2007 | Lindahl ............... G09B 21/003 340/4.12 |
| 9,754,464 | B1* | 9/2017 | Sinkov ..................... G08B 6/00 |
| 9,760,241 | B1* | 9/2017 | Lewbel ................. G06F 1/1626 |
| 10,649,529 | B1* | 5/2020 | Nekimken ............ G06F 1/1688 |
| 2002/0033795 | A1* | 3/2002 | Shahoian ............ G06F 3/03547 345/156 |
| 2007/0016425 | A1* | 1/2007 | Ward ..................... A61H 3/061 704/271 |

(Continued)

OTHER PUBLICATIONS

VibroGlove: An assistive technology aid for conveying facial expressions; http://sbala.org/projects/vibroglove/chi2010.pdf; Published/Accessed: Apr. 12-13, 2010.

(Continued)

*Primary Examiner* — Robert J Utama
*Assistant Examiner* — Sadaruz Zaman
(74) *Attorney, Agent, or Firm* — Dinsmore & Shohl LLP

(57) ABSTRACT

A device for providing a tactile feedback includes an imaging device configured to capture an image of a face of a subject, a tactile feedback device, and a controller communicatively coupled to the imaging device and the tactile feedback device. The controller comprising at least one processor and at least one memory storing computer readable and executable instructions that, when executed by the processor, causes the controller to: process the image, determine a type of a facial expression based on the processed image, determine a level of a facial expression of the type based on the processed image, determine a tactile feedback intensity of the tactile feedback device based on the level of the facial expression, and control the tactile feedback device to provide a tactile feedback having the tactile feedback intensity.

18 Claims, 5 Drawing Sheets

(56) References Cited

U.S. PATENT DOCUMENTS

| | | | | |
|---|---|---|---|---|
| 2009/0027233 | A1* | 1/2009 | Li | G06F 3/023 341/20 |
| 2009/0231276 | A1* | 9/2009 | Ullrich | G10H 1/0066 345/157 |
| 2010/0086215 | A1* | 4/2010 | Bartlett | G06K 9/00335 382/197 |
| 2012/0007809 | A1* | 1/2012 | Mahalingam | G09B 21/003 345/173 |
| 2013/0035742 | A1* | 2/2013 | Talbot | G06K 9/00228 607/54 |
| 2013/0245396 | A1* | 9/2013 | Berman | G06F 19/3418 600/301 |
| 2014/0123003 | A1* | 5/2014 | Song | G06F 3/04886 715/701 |
| 2014/0143682 | A1* | 5/2014 | Druck | G06Q 10/107 715/752 |
| 2014/0253478 | A1* | 9/2014 | Jeong | G06F 3/041 345/173 |
| 2014/0333564 | A1* | 11/2014 | Hong | G06F 3/041 345/173 |
| 2015/0062052 | A1* | 3/2015 | Bernstein | G06F 3/0416 345/173 |
| 2015/0234464 | A1* | 8/2015 | Yliaho | G06F 3/048 345/473 |
| 2015/0253850 | A1* | 9/2015 | Behles | G06F 3/0488 715/702 |
| 2015/0253851 | A1* | 9/2015 | Oh | G06F 3/04883 345/179 |
| 2015/0254471 | A1* | 9/2015 | You | G06F 21/6245 726/19 |
| 2015/0310762 | A1* | 10/2015 | Seim | G09B 15/00 434/113 |
| 2016/0034133 | A1* | 2/2016 | Wilson | G06F 3/0488 715/772 |
| 2016/0048202 | A1* | 2/2016 | Hwang | G06F 3/012 345/156 |
| 2016/0078278 | A1 | 3/2016 | Moore et al. | |
| 2016/0080897 | A1 | 3/2016 | Moore et al. | |
| 2016/0209648 | A1 | 7/2016 | Haddick et al. | |
| 2016/0253552 | A1* | 9/2016 | Rihn | G06F 3/016 382/224 |
| 2016/0259410 | A1* | 9/2016 | Moore | G06F 3/016 |
| 2016/0342851 | A1* | 11/2016 | Holz | G06K 9/00906 |
| 2017/0046025 | A1* | 2/2017 | Dascola | G06F 3/0233 |
| 2017/0053542 | A1* | 2/2017 | Wilson | G09B 5/02 |
| 2017/0061201 | A1* | 3/2017 | Wexler | G06K 9/00255 |
| 2017/0083086 | A1* | 3/2017 | Mazur | G06F 3/012 |
| 2018/0144185 | A1* | 5/2018 | Yoo | G06K 9/00255 |

OTHER PUBLICATIONS

New Braille technology helps visually impaired "see" emotions; https://nrb.org/images/nfb/publications/bm/bm10/bm1007/bm100707.htm; Published/Accessed: Jul. 2010.

iFeeding rendering system; https://www.diva-portal.org/smash/get/diva2:308457/FULLTEXT01.pdf; Published/Accessed: Apr. 2010.

Braille for faces: using a camera and tactile display, system lets blind "see" others' emotions; http://www.popsci.com/technology/article/2010-04/using-web-cam-and-tactile-display-system-lets-blind-see-facial-expressions; Published/Accessed: Apr. 29, 2010.

How to see a smile even without sight; http://www.wonderbaby.org/news/new-app-detects-smile; Published/Accessed Sep. 13, 2015.

Enhancing emotion recognition in VIPs with haptic feedback; http://link.springer.com/chapter/10.1007%2F978-3-319-40542-1_25; Published/Accessed: Jun. 22, 2016.

* cited by examiner

DEVICES AND METHODS FOR PROVIDING TACTILE FEEDBACK

TECHNICAL FIELD

The present specification generally relates to devices for providing tactile feedback and, more specifically, to devices that provide varying tactile feedback based on the level of a facial expression of a subject proximate to the devices.

BACKGROUND

A person with impaired vision may not be able to recognize a facial expression of a subject near to him or her. In addition, a person with impaired vision may not be able to recognize the level of a facial expression (e.g., the level of smiling) of the subject. It may be desirable to provide information on the level of a facial expression made by a subject.

Accordingly, a need exists for devices that provide tactile feedback based on the level of a facial expression of a subject.

SUMMARY

In one embodiment, a device for providing a tactile feedback includes an imaging device configured to capture an image of a face of a subject, a tactile feedback device, and a controller communicatively coupled to the imaging device and the tactile feedback device. The controller comprising at least one processor and at least one memory storing computer readable and executable instructions that, when executed by the processor, causes the controller to: process the image of the face to determine one or more facial expression parameters, determine a level of smiling of the subject based on the one or more facial expression parameters, determine a tactile feedback intensity of the tactile feedback device based on the level of smiling, and control the tactile feedback device to provide the tactile feedback having the determined tactile feedback intensity.

In another embodiment, a device for providing a tactile feedback includes an imaging device configured to capture an image of a face of a subject, a tactile feedback device, and a controller communicatively coupled to the imaging device and the tactile feedback device. The controller comprising at least one processor and at least one memory storing computer readable and executable instructions that, when executed by the processor, causes the controller to: process the image, determine a type of a facial expression based on the processed image, determine a level of a facial expression of the type based on the processed image, determine a tactile feedback intensity of the tactile feedback device based on the level of the facial expression, and control the tactile feedback device to provide a tactile feedback having the tactile feedback intensity.

In another embodiment, a method for providing a tactile feedback includes: identifying, by an imaging device, a subject proximate to the device, capturing, by the imaging device, an image of a face of the subject, processing, by a processor, the image to determine one or more facial expression parameters, determining, by the processor, a type of a facial expression of the face based on the one or more facial expression parameters, determining, by the processor, a level of the facial expression based on the one or more facial expression parameters, determining, by the processor, a tactile feedback intensity of the device based on the level of the facial expression, and providing, by a tactile feedback device of the device, the tactile feedback having the determined tactile feedback intensity.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1A:
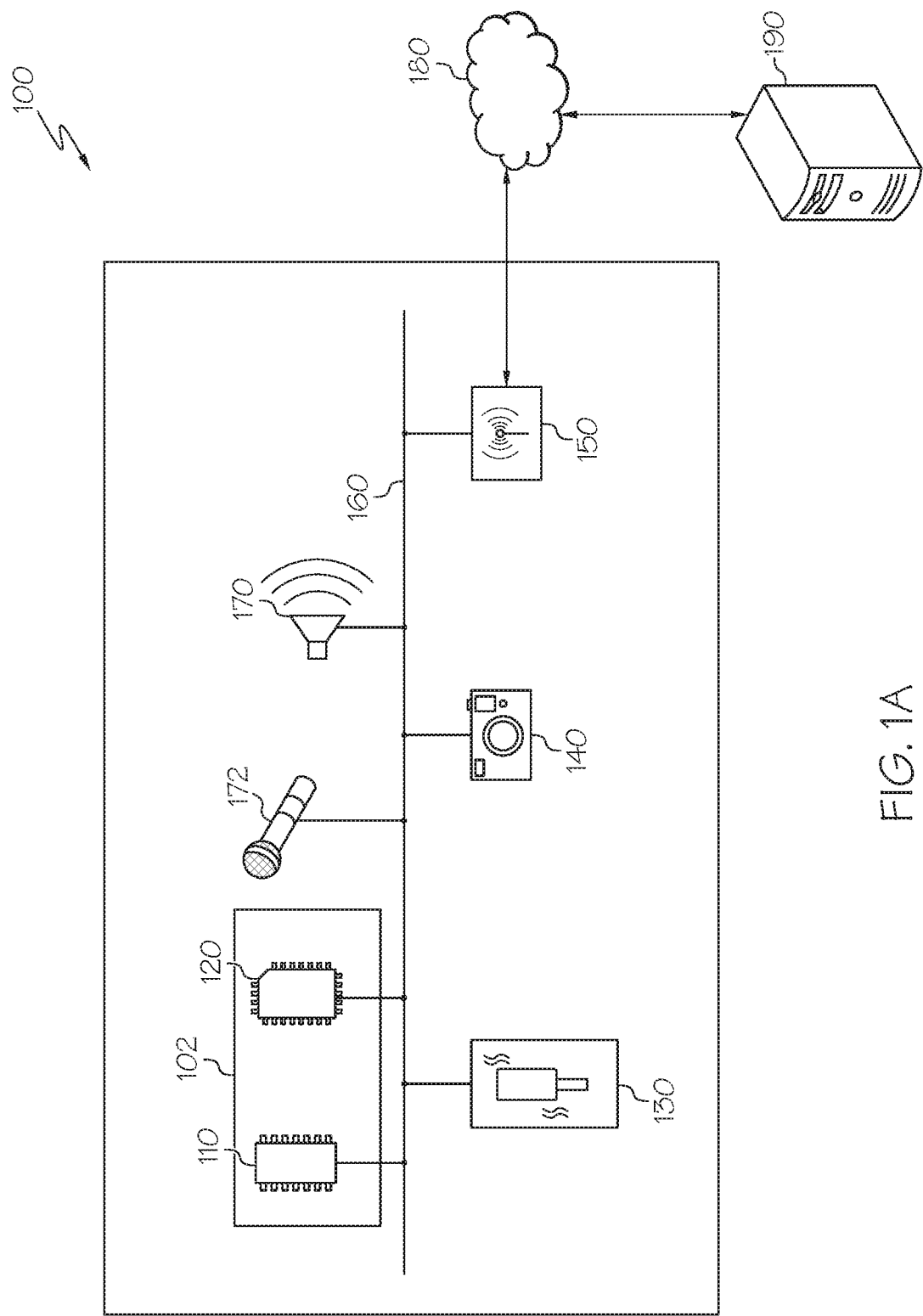
FIG. 1A schematically depicts an exemplary embodiment of various electronic components of a device for providing tactile feedback to a user in accordance with one or more embodiments shown and described herein.

The embodiments disclosed herein include devices that provide tactile feedback based on a level of a facial expression of a subject. Referring generally to FIG. 1A, a tactile feedback includes an imaging device configured to capture an image of a face of a subject, a tactile feedback device, and a controller communicatively coupled to the imaging device and the tactile feedback device. The controller comprising at least one processor and at least one memory storing computer readable and executable instructions that, when executed by the processor, causes the controller to: process the image, determine a type of a facial expression based on the processed image, determine a level of a facial expression of the type based on the processed image, determine a tactile feedback intensity of the tactile feedback device based on the level of the facial expression, and control the tactile feedback device to provide a tactile feedback having the tactile feedback intensity. The user of the device may easily recognize the degree of a facial expression with the help of changing tactile feedback intensity of the device.

Some vision assist devices do not provide information on the level of a facial expression made by a person. For example, a user of a conventional vision assist device cannot recognize a level of smiling of a person in front of the user. The embodiments described herein overcome this limitation by providing varying tactile feedback based on the level of a facial expression of a person.

Referring now to the drawings, FIG. 1A schematically depicts an exemplary embodiment of a device 100 for providing tactile feedback to a user in accordance with one or more embodiments shown and described herein. The device 100 includes a controller 102, a tactile feedback device 130, an imaging device 140, network interface hardware 150, a communication path 160, an audible feedback device 170, and a microphone 172. The various components of the device 100 will now be described.

The controller 102 includes a processor 110 and a non-transitory electronic memory 120 to which various components are communicatively coupled, as will be described in further detail below. In some embodiments, the processor 110 and the non-transitory electronic memory 120 and/or the other components are included within a single device. In other embodiments, the processor 110 and the non-transitory electronic memory 120 and/or the other components may be distributed among multiple devices that are communicatively coupled.

The device 100 includes the non-transitory electronic memory 120 that stores a set of machine readable instructions. The processor 110 may execute the machine readable instructions stored in the non-transitory electronic memory 120. The non-transitory electronic memory 120 may comprise ROM, flash memories, hard drives, or any device capable of storing machine readable instructions such that the machine readable instructions can be accessed by the processor 110. The machine readable instructions comprise logic or algorithm(s) written in any programming language of any generation (e.g., 1GL, 2GL, 3GL, 4GL, or 5GL) such as, for example, machine language that may be directly executed by the processor 110, or assembly language, object-oriented programming (OOP), scripting languages, microcode, etc., that may be compiled or assembled into machine readable instructions and stored in the non-transitory electronic memory 120. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. The non-transitory electronic memory 120 may be implemented as one memory module or a plurality of memory modules.

In some embodiments, the non-transitory electronic memory 120 includes instructions for executing the functions of the device 100. The instructions include instructions for determining a type of a facial expression, instructions for determining a level of a facial expression, instructions for determining a pattern of feedback, instructions for determining an intensity of feedback, and instructions for controlling a tactile feedback device to output tactile feedback at an intensity.

The instructions for determining a type of a facial expression, when executed by the processor 110, may determine a type of a facial expression of a captured image. The type of a facial expression may include happy, smile, sad, surprise, angry, fear, disgust, etc. The instructions for determining the type of a facial expression may include image recognition algorithm that is implemented on a captured image.

The instructions for determining the level of a facial expression, when executed by the processor 110, may determine a level of a facial expression of a captured image. For example, once the type of a facial expression is determined as a smiling facial expression, the instructions for determining the level of a facial expression may determine the level of smiling of the facial expression. The level may be indicated as between 0% and 100%. The level of smiling will be described in further detail below with reference to FIG. 2.

The instructions for determining a pattern of feedback, when executed by the processor 110, may determine a pattern of feedback based on the type of a facial expression. For example, different patterns of feedback may be used for different facial expressions, such as smiling and angry facial expressions. The patterns of feedback will be described in further detail below with reference to FIG. 2.

The instructions for determining an intensity of feedback, when executed by the processor 110, may determine an intensity of feedback based on the level of a facial expression. For example, the intensity of vibration feedback of the device 100 may be proportional to the level of a facial expression. The functionality of each of these instructions will be described in further detail below. The intensity of feedback will be described in further detail below with reference to FIGS. 2, 3, 4A, and 4B.

The processor 110 may be any device capable of executing machine readable instructions. For example, the processor 110 may be an integrated circuit, a microchip, a computer, or any other computing device. The non-transitory electronic memory 120 and the processor 110 are coupled to the communication path 160 that provides signal interconnectivity between various components and/or modules of the device 100. Accordingly, the communication path 160 may communicatively couple any number of processors with one another, and allow the modules coupled to the communication path 160 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 160 may be formed from any medium that is capable of transmitting a signal such as, for example, conductive wires, conductive traces, optical waveguides, or the like. Moreover, the communication path 160 may be formed from a combination of mediums capable of transmitting signals. In some embodiments, the communication path 160 comprises a combination of conductive traces, conductive wires, connectors, and buses that cooperate to permit the transmission of electrical data signals to components such as processors, memories, sensors, input devices, output devices, and communication devices. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The tactile feedback device 130 may be any device capable of providing tactile feedback to a user. The tactile feedback device 130 may include a vibration device (such as in embodiments in which tactile feedback is delivered through vibration), an air blowing device (such as in embodiments in which tactile feedback is delivered through a puff of air), or a pressure generating device (such as in embodiments in which the tactile feedback is delivered through generated pressure). In some embodiments, the tactile feedback device 130 comprises an array of feedback devices that provide the user with more detailed feedback. For example, an array (e.g., a 2×2 array or 3×3 array) of tactile feedback devices can provide different kinds of feedback to the user. For example, tactile feedback received on a left side of a user may indicate one type of a facial expression, such as smiling facial expression, and tactile feedback received on a right side of a user may indicate another type of a facial expression, such as angry facial expression. In some embodiments, the tactile feedback device 130 is wearable on the user, for example as a necklace, a belt, a wristband, a waist-pack, an adhesive, or a button. In some embodiments, the tactile feedback device 130 is located in a device separate from some or all of the other components of the device 100 and communicatively coupled with the device 100.

The device 100 may comprise the imaging device 140. The imaging device 140 is coupled to the communication path 160 and communicatively coupled to the processor 110. The imaging device 140 may be any device having one or more sensing devices (e.g., pixels) capable of detecting radiation in an ultraviolet wavelength band, a visible light wavelength band, or an infrared wavelength band. The imaging device 140 may have any resolution. The imaging device 140 may include an omni-directional camera, or a panoramic camera. In some embodiments, one or more optical components, such as a mirror, fish-eye lens, or any other type of lens may be optically coupled to the imaging device 140. The imaging device 140 may be used to capture an image of a subject (e.g., a human, an animal, a robot, etc.) proximate to a user of the device 100.

The device 100 may comprise network interface hardware 150 for communicatively coupling the device 100 to a server 190 (e.g., an image storage server). The network interface hardware 150 can be communicatively coupled to the communication path 160 and can be any device capable of transmitting and/or receiving data via a network. Accordingly, the network interface hardware 150 can include a communication transceiver for sending and/or receiving any wired or wireless communication. For example, the network interface hardware 150 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 150 includes hardware configured to operate in accordance with the Bluetooth wireless communication protocol. Some embodiments may not include the network interface hardware 150.

The audible feedback device 170 may be any device capable of providing audible feedback to a user. The audible feedback device 170 may include a speaker, headphones, or the like. In some embodiments, the audible feedback may be delivered to the user with the speaker or headphones in a 3-dimensional (3D) audio placement format. In some embodiments, the audible feedback device 170 is integral with the device 100, as depicted in FIG. 1. In further embodiments, the audible feedback device 170 is located in a device separate from some or all of the other components of the device 100 and communicatively coupled with the device 100. In some embodiments, the audible feedback device 170 is not included in the device 100.

The microphone 172 is coupled to the communication path 160 and communicatively coupled to the processor 110. The microphone 172 may receive acoustic vibrations from a person proximate to the device 100 and transform the acoustic vibrations into an electrical signal indicative of a sound from the person. The electrical signal indicative of the sound may be assessed to determine one or more speech parameters. The one or more speech parameters may include a parameter for a volume of the speech, a parameter for an accent of the speech, a parameter for an intonation of the speech, etc.

The device 100 may be communicatively coupled to the server 190 by a network 180. In one embodiment, the network 180 may include one or more computer networks (e.g., a personal area network, a local area network, or a wide area network), cellular networks, satellite networks and/or a global positioning system and combinations thereof. Accordingly, the device 100 can be communicatively coupled to the network 180 via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable cellular networks include, but are not limited to, technologies such as LTE, WiMAX, UMTS, CDMA, and GSM.

While FIG. 1 depicts the controller 102 including the processor 110 and the non-transitory electronic memory 120, the tactile feedback device 130, the imaging device 140, the network interface hardware 150, the audible feedback device 170, and the microphone 172 in a single, integral device 100, it should be understood that one or more of these components may be distributed among multiple devices in a variety of configurations.

Figure 1B:
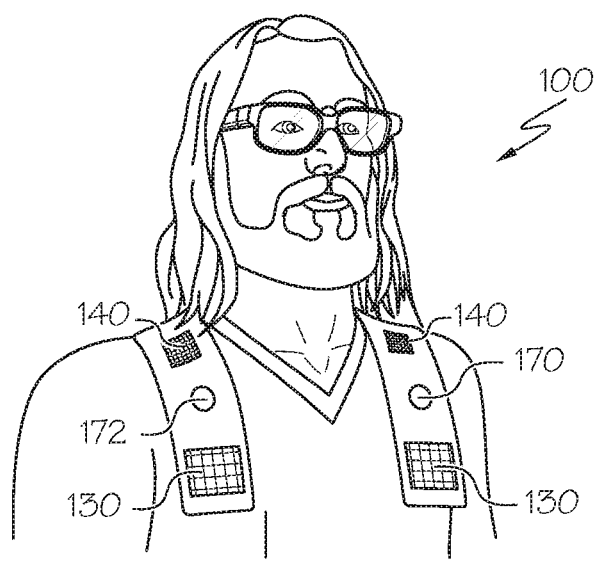
FIG. 1B depicts a front view of a device in accordance with one or more embodiments shown and described herein.

FIG. 1B depicts a front view of the device in FIG. 1A according to one or more embodiments shown and described herein. In FIG. 1B, the device 100 includes two tactile feedback devices 130, two imaging devices 140, the audible feedback device 170 and the microphone 172. While FIG. 1B depicts two tactile feedback devices 130 and two imaging devices 140 of the device 100, the device 100 may include more than two or less than two tactile feedback devices 130 or imaging devices 140.

Figure 2:
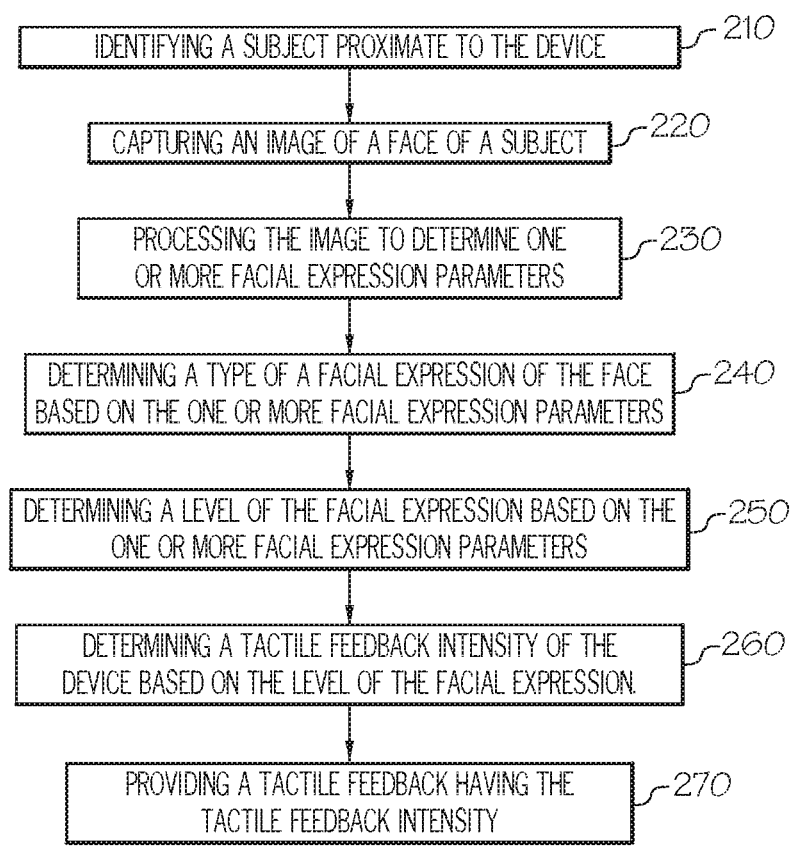
FIG. 2 depicts a flow chart of a method for providing tactile feedback using a device in accordance with one or more embodiments shown and described herein.

FIG. 2 depicts a flow chart of a method for providing tactile feedback using a device in accordance with one or more embodiments shown and described herein. In step 210, the imaging device 140 of the device 100 identifies a subject proximate to the device 100. The imaging device 140 may be operable to sense the location and movement of the subject. The imaging device 140 can locate the subject as a whole or can locate more specific segments of the subject, such as the subject's face. In another embodiment, the microphone 172 may receive acoustic vibrations from a person proximate to the device 100 and transform the acoustic vibrations into an electrical signal indicative of the sound. The electrical signal indicative of the sound may be assessed to determine an identity of the subject.

In step 220, the imaging device 140 captures an image of the face of the subject. For example, the imaging device 140 of the device 100 may take a photo of a face of a person locating in front of the device 100. The processor 110 of the device 100 may implement image recognition algorithms on the captured image to identify the person. For example, face recognition algorithms or other conventional image recognition algorithms may be used to determine an identity of the person. In step 230, the processor 110 of the device 100 processes the captured image to determine one or more facial expression parameters. The one or more facial expression parameters may include parameters for common facial features including, but not limited to, parameters for teeth, parameters for eyes, parameters for an outer lip, parameters for a curvature of the face, etc. The facial expression parameters may be stored in the non-transitory electronic memory 120 in association with the identity of the subject.

The parameters for teeth may include a value proportional to the number of teeth shown in the captured image. The parameters for teeth may also include a value related to the size of teeth exposed in the captured image. The parameters for eyes may include a degree of opening of the eyes, the contour of the eyes, etc. The parameters for an outer lip may include a size of the opening of the outer lip, the contour of the outer lip, etc.

In step 240, the processor 110 determines a type of a facial expression of the face based on the one or more facial expression parameters. In one embodiment, the processor 110 may compare the one or more facial expression parameters with predetermined facial expression parameters associated facial expressions of various types, such as happy, smile, sad, surprise, angry, fear, disgust, etc. For example, the processor 110 may determine that the type of the facial expression of the captured image is a smiling facial expression, if the one or more facial expression parameters deviate from the predetermined parameters associated with smiling facial expression among predetermined parameters associated with various facial expressions by a smallest amount. The determined type of a facial expression may be stored in the non-transitory electronic memory 120 along with the one or more facial expression parameters and/or the identity of the subject.

In some embodiments, the processor 110 may retrieve facial expression parameters associated with the subject that are previously stored in the non-transitory electronic memory 120. For example, when the imaging device 140 captures an image of a person A's face and determines the identification of the person A, the processor 110 may retrieve facial expression parameters associated with the person A's smile facial expression, facial expression parameters associated with the person A's angry facial expression, facial expression parameters associated with the person A's crying facial expression, etc. from the non-transitory electronic memory 120. Then, the processor 110 may compare facial expression parameters of the captured image with facial expression parameters retrieved from the non-transitory electronic memory 120. If the facial expression parameters of the captured image have least deviations from facial expression parameters associated with the person A's smiling facial expression among the retrieved facial expression parameters, the processor 110 determines the type of the facial expression of the captured image as smiling facial expression. Similarly, if the facial expression parameters of the captured image have least deviations from facial expression parameters associated with the person A's angry facial expression among the retrieved facial expression parameters, the processor 110 determines the type of the facial expression of the captured image as angry facial expression.

In another embodiment, the processor 110 may retrieve facial expression parameters associated with the subject from the server 190 via the network 180. The server 190 may store facial expression parameters in association with an identity of a subject and a type of a facial expression. For example, when the imaging device 140 captures an image of a person B's face and determines the identification of the person B, the processor 110 may retrieve facial expression parameters associated with the person B's smile facial expression, facial expression parameters associated with the person B's angry facial expression, facial expression parameters associated with the person B's crying facial expression, etc. from the server 190. Then, the processor 110 may compare facial expression parameters of the captured image with facial expression parameters retrieved from the server 190.

In step 250, the processor 110 determines a level of the facial expression of the captured image based on the one or more facial expression parameters. The processor 110 may compare the one or more facial expression parameters of the captured image with facial expression parameters associated with various levels of a facial expression. The facial expression parameters associated with various levels of a facial expression, such as smiling, may be stored the non-transitory electronic memory 120. In one embodiment, facial expression parameters associated with 0% of smiling up to 100% of smiling with an increment of a certain percentage (e.g., 10%) may be stored in the non-transitory electronic memory 120. The facial expression parameters stored in the non-transitory electronic memory 120 may be associated with the identity of a person. If facial expression parameters associated with a certain level of smiling have least deviations from the one or more facial expression parameters of the captured image, the processor 110 may determine the certain level as the level of a facial expression for the captured image. For example, the processor 110 may calculate deviations between the one or more facial expression parameters of the captured image and facial expression parameters associated with different levels of smiling. If the deviation between the one or more facial expression parameters of the captured image and facial expression parameters associated with 50% of smiling is the smallest, the processor 110 may determine that the level of smiling for the captured image is 50% of smiling.

In another embodiment, facial expression parameters associated with 0% of angry facial expression up to 100% of angry facial expression with an increment of a certain percentage (e.g., 20%) may be stored in the server 190. The processor 110 may determine facial expression parameters associated with a certain level of angry facial expression that have least deviations from the one or more facial expression parameters of the captured image. For example, the processor 110 may calculate deviations between the one or more facial expression parameters of the captured image and angry facial expression parameters associated with different levels of a facial expression. If the deviation between the one or more facial expression parameters of the captured image and angry facial expression parameters associated with 100% of angry facial expression is the smallest, the processor 110 may determine that the level of angry facial expression for the captured image is 100% of angry facial expression.

In step 260, the processor 110 determines a tactile feedback intensity (e.g., a vibration intensity) of the tactile feedback device 130 based on the determined level of a facial expression. The tactile feedback intensity of the tactile feedback device 130 may be proportional to the level of the facial expression. For example, the processor 110 may determine the tactile feedback intensity of the tactile feedback device 130 as 50% of the maximum tactile feedback intensity if the determined level of smiling is 50%, and determine the tactile feedback intensity of the tactile feedback device 130 as 100% of the maximum tactile feedback intensity if the determined level of smiling is 100%. In another example, the processor 110 may determine the tactile feedback intensity of the tactile feedback device 130 as 30% of the maximum tactile feedback intensity if the determined level of angry facial expression is 30%.

In some embodiments, the processor 110 may determine a tactile feedback intensity of the tactile feedback device 130 further based on speech parameters including a volume of speech from the microphone 172. For example, the processor 110 may determine a tactile feedback intensity of the tactile feedback device 130 based on a weighted average of the level of the facial expression and the level of volume of speech. If the level of smiling is 70% and the level of volume of speech is 30%, the tactile feedback intensity of the tactile feedback device 130 may be calculated as $\alpha \times 0.7 + \beta \times 0.3$, wherein $\alpha + \beta = 1$. The parameters $\alpha$ and $\beta$ may be predetermined values.

In step 270, the device 100 provides a tactile feedback based on the determined tactile feedback intensity. The machine readable instructions in the non-transitory electronic memory 120, when executed by the processor 110, cause the device 100 to provide tactile feedback or audible feedback to the user. When the device 100 determines that a person proximate to the device 100 is smiling with a smiling level of 50%, the processor 110 transmits a signal to the tactile feedback device 130 and/or the audible feedback device 170 to provide feedback to a user, for example a vibration with intensity of 50% of maximum vibration and/or a sound with a volume of 50% of maximum volume. In some embodiments, the tactile feedback is provided as vibrations, air puffs, pressure, or the like. In other embodiments, the audible feedback is provided as speech or abstract sounds. In further embodiments, feedback is provided in multiple forms, each associated with a type of a facial expression.

The device 100 may be configured to recognize a type of a facial expression and a level of a facial expression. In one embodiment, the device 100 may provide different patterns of vibration depending on a type of a facial expression. For example, the device 100 may provide a vibration pattern A when it is determined that the type of a facial expression of the captured image is a smiling facial expression, and provide a vibration pattern B when it is determined that the type of a facial expression in the captured image is angry facial expression. The vibration pattern A may be different from the vibration pattern B. For example, the vibration pattern A may be a continuous vibration for a predetermined time and the vibration pattern B may be an intermittent vibration. In another embodiment, the device 100 may use different vibration patterns that correspond to Morse code. For example, the device 100 may provide a vibration pattern corresponding to Morse code A when it is determined that the type of a facial expression in the captured image is a smiling facial expression, and provide a vibration pattern corresponding to Morse code B when it is determined that the type of a facial expression in the captured image is an angry facial expression.

As noted above, in some embodiments, the tactile feedback device 130 comprises an array of tactile feedback devices, such as vibrating devices. In embodiments that include an array of tactile feedback devices, the tactile feedback device 130 may provide the user more detailed information about the type of a facial expression and a level of a facial expression. For example, a tactile feedback device 130 that includes an array of vibrating devices may be incorporated into a device, such as a belt. The processor 110 may signal feedback using the array to provide feedback depending on the type of a facial expression. For example, when the determined facial expression of a captured image is a smiling facial expression, the processor 110 may send to the tactile feedback device 130 a signal for activating the vibrating devices on the left side of the tactile feedback array. Such feedback may inform the user that the person proximate to the user is smiling. In another example, when the determined facial expression of a captured image is an angry facial expression, the processor 110 may send to the tactile feedback device 130 a signal for activating the vibrating devices on the right side of the tactile feedback array. More complex arrays may be provided in order to communicate various types of a facial expression to the user. It should be understood that the tactile feedback device 130 may be housed in a plurality of devices, both wearable and non-wearable.

Figure 3:
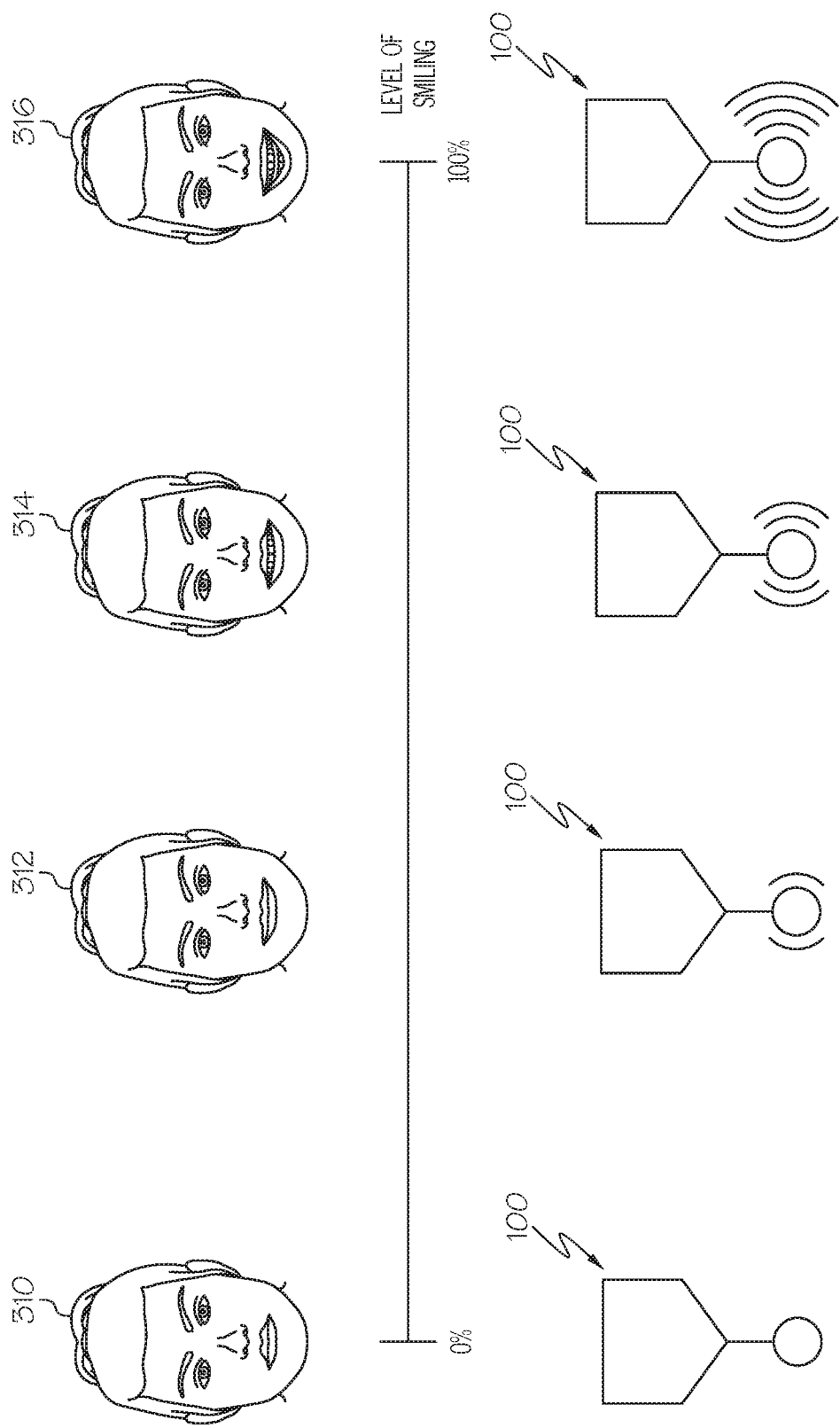
FIG. 3 schematically depicts a relationship between a level of a facial expression and a tactile feedback intensity in accordance with one or more embodiments shown and described herein.

FIG. 3 schematically depicts a relationship between a level of a facial expression and a tactile feedback intensity in accordance with one or more embodiments shown and described herein. In FIG. 3, four samples of captured images 310, 312, 314, and 316 are presented. The processor 110 may process the captured images 310, 312, 314, and 316 to determine one or more facial expression parameters for each of the captured images. Then, the processor 110 may determine the type of a facial expression of the captured images based on the one or more facial expression parameters. For example, the processor may determine that the captured image 310 is a neutral facial expression, and the captured images 312, 314, and 316 are smiling facial expressions.

The processor 110 may determine a level of smiling for captured images 312, 314, and 316 based on the one or more facial expressions. For example, the processor 110 may determine the level of smiling for captured images 312, 314, and 316 based on the number of teeth shown in the image, the size of the teeth on the image, the contour of an outer lip, the opening of a mouth, the shape of eyes, etc. In this example, the processor 110 may determine the level of smiling for captured image 312 as 30%, the level of smiling for captured image 314 as 60%, and the level of smiling for captured image 316 as 100%. The processor 110 may determine that the level of smiling for captured image 310 is 0% because the captured image 310 is neutral facial expression.

The processor 110 may control a tactile feedback intensity of the device 100 based on the determined level of the smiling facial expression. As shown in FIG. 3, the device 100 does not vibrate when the level of smiling for captured image 310 is 0%. As the level of smiling increases, the tactile feedback intensity of the device 100 increases proportional to the level of smiling. For example, for the captured image 312, because the level of smiling is determined as 30%, the level of vibration of the device 100 is 30% of the maximum vibration intensity. For the captured image 314, because the level of smiling is determined as 60%, the level of vibration of the device 100 is 60% of the maximum vibration intensity. For the captured image 316, because the level of smiling is determined as 100%, the level of vibration of the device 100 is 100% of the maximum vibration intensity.

With the changing level of tactile feedback intensity, the user of the device 100 may easily recognize the level of a facial expression, and thus, can interact with people proximate to the device 100 more adequately.

Figure 4A:
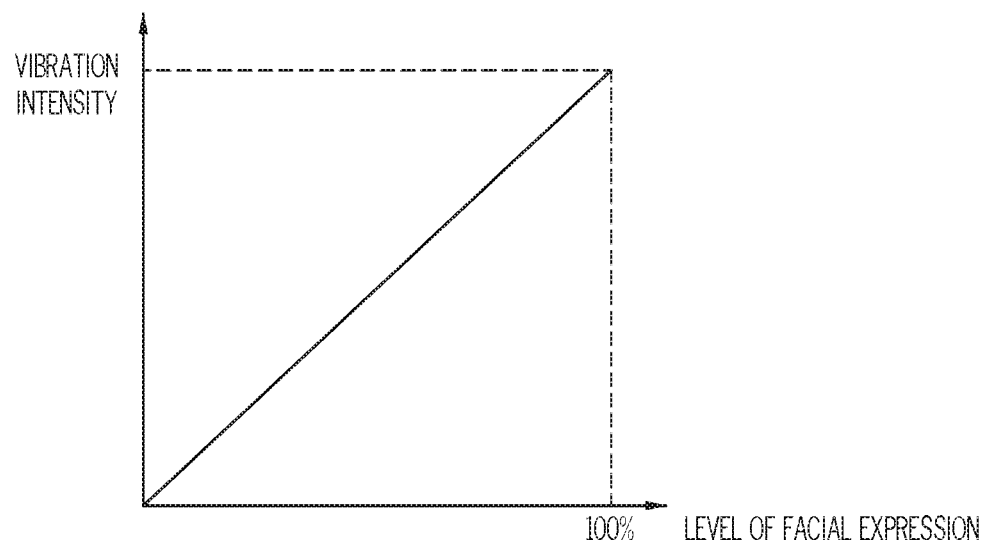
FIG. 4A depicts a graph illustrating a relationship between a level of a facial expression and a tactile feedback intensity of the tactile feedback device in accordance with one or more embodiments shown and described herein.
Figure 4B:
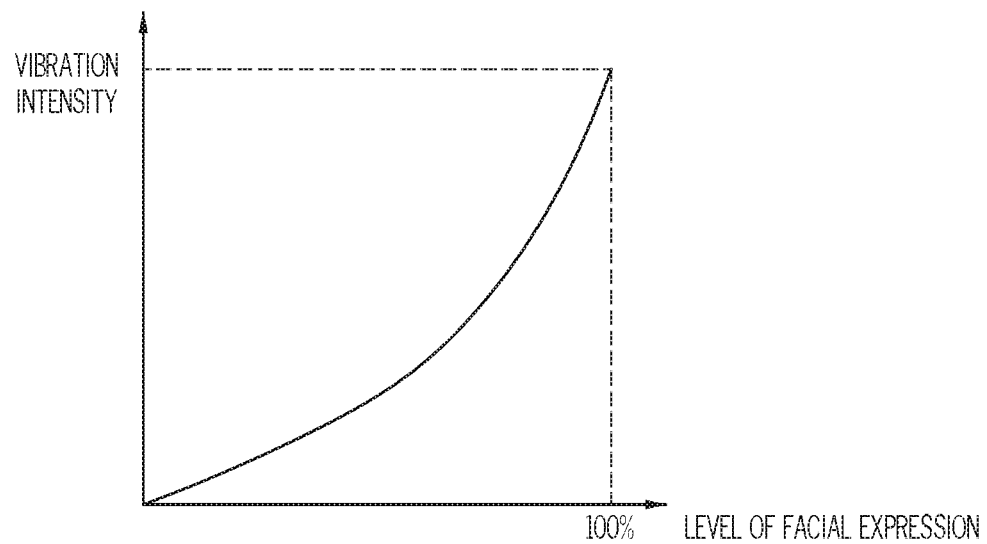
FIG. 4B depicts a graph illustrating a relationship between a level of a facial expression and a tactile feedback intensity of the tactile feedback device in accordance with another embodiment shown and described herein.

FIGS. 4A and 4B depict graphs illustrating a relationship between the level of a facial expression and the tactile feedback intensity of the tactile feedback device 130. In FIG. 4A, the tactile feedback intensity of the tactile feedback device 130 is linearly proportional to the level of a facial expression. For example, if the level of smiling for a certain image is determined as 50% by the processor 110, the tactile feedback intensity of the tactile feedback device 130 is determined as 50% of the maximum tactile feedback intensity. In FIG. 4B, the tactile feedback intensity of the tactile feedback device 130 is exponentially proportional to the level of a facial expression. In this embodiment, the user of the device 100 may easily recognize the change of a facial expression when the level of a facial expression is more than 50% because the tactile feedback intensity of the tactile feedback device 130 changes more rapidly than the tactile feedback intensity in FIG. 4A.

It should be understood that embodiments described herein are directed to devices and methods that provide varying tactile feedback based on a level of a facial expression of a person. A device for providing a tactile feedback includes an imaging device configured to capture an image of a face of a subject, a tactile feedback device, and a controller communicatively coupled to the imaging device and the tactile feedback device. The controller comprising at least one processor and at least one memory storing computer readable and executable instructions that, when executed by the processor, causes the controller to: process the image, determine a type of a facial expression based on the processed image, determine a level of a facial expression of the type based on the processed image, determine a tactile feedback intensity of the tactile feedback device based on the level of the facial expression, and control the tactile feedback device to provide a tactile feedback having the tactile feedback intensity. The user of the device may easily recognize the degree of a facial expression with the help of changing tactile feedback intensity of the device.

It is noted that the terms "substantially" and "proximate" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A device for providing a tactile feedback, the device comprising:
    an imaging device configured to capture an image of a face of a subject;
    a microphone configured to output an electrical signal indicative of a sound of the subject;
    a tactile feedback device configured to output tactile feedback; and
    a controller communicatively coupled to the imaging device and the tactile feedback device, the controller comprising at least one processor and at least one memory storing computer readable and executable instructions that, when executed by the processor, causes the controller to:
    process the image of the face to determine one or more facial expression parameters;
    determine a level of smiling of the subject based on the one or more facial expression parameters;
    determine a volume of the sound of the subject based on the electrical signal;
    determine a tactile feedback intensity of the tactile feedback device based on the level of smiling of the subject and the volume of the sound of the subject; and
    control the tactile feedback device to provide the tactile feedback having the determined tactile feedback intensity,
    wherein the tactile feedback intensity increases as the level of smiling increases.

2. The device of claim 1, wherein the tactile feedback intensity is proportional to the level of smiling.

3. The device of claim 1, wherein the tactile feedback comprises at least one of vibrations, air puffs, and pressure.

4. The device of claim 1, wherein the one or more facial expression parameters includes at least one of a parameter for teeth, a parameter for eyes, and a parameter for an outer lip.

5. The device of claim 1, wherein processing the image of the face to determine the one or more facial expression parameters includes processing the image using neural network image recognition.

6. The device of claim 1, wherein determining the level of smiling of the subject based on the one or more facial expression parameters comprises comparing the one or more facial expression parameters with predetermined facial parameters associated with a certain level of smiling.

7. A device for providing a tactile feedback, the device comprising:
    an imaging device configured to capture an image of a face of a subject;
    a microphone configured to output an electrical signal indicative of a sound of the subject;
    a tactile feedback device configured to output tactile feedback; and
    a controller communicatively coupled to the imaging device and the tactile feedback device, the controller comprising at least one processor and at least one memory storing computer readable and executable instructions that, when executed by the processor, causes the controller to:
    process the image;
    determine a type of a facial expression based on the processed image;
    determine a level of a facial expression of the type based on the processed image;
    determine a volume of the sound of the subject based on the electrical signal;
    determine a tactile feedback intensity of the tactile feedback device based on the level of the facial expression of the subject and the volume of the sound of the subject; and
    control the tactile feedback device to provide a tactile feedback having the tactile feedback intensity,
    wherein the tactile feedback intensity increases as the level of the facial expression increases.

8. The device of claim 7, wherein the computer readable and executable instructions, when executed by the processor, further causes the controller to determine a tactile feedback pattern of the tactile feedback device based on the type of the facial expression.

9. The device of claim 8, wherein the tactile feedback pattern includes at least one of a continuous tactile feedback and an intermittent tactile feedback.

10. The device of claim 8, wherein the tactile feedback pattern includes a tactile feedback pattern corresponding to Morse code.

11. The device of claim 7, wherein the type of the facial expression includes at least one of happy, smile, sad, surprise, angry, fear, and disgust.

12. The device of claim 7, wherein processing the image includes processing the image using neural network image recognition.

13. The method for providing a tactile feedback, the method comprising:
- identifying, by an imaging device, a subject proximate to the device;
- capturing, by the imaging device, an image of a face of the subject;
- processing, by a processor, the image to determine one or more facial expression parameters;
- receiving, by the processor, an electrical signal indicative of a sound of the subject from a microphone;
- determining, by the processor, a type of a facial expression of the face based on the one or more facial expression parameters;
- determining, by the processor, a level of the facial expression based on the one or more facial expression parameters;
- determining, by the processor, a volume of the sound of the subject based on the electrical signal;
- determining, by the processor, a tactile feedback intensity of the device based on the level of the facial expression of the subject and the volume of the sound of the subject; and
- providing, by a tactile feedback device of the device, the tactile feedback having the determined tactile feedback intensity, wherein the tactile feedback intensity increases as the level of the facial expression increases.

14. The method of claim 13, wherein determining the level of the facial expression of the subject based on the one or more facial expression parameters comprises comparing the one or more facial expression parameters with predetermined facial parameters associated with a certain level of the facial expression.

15. The method of claim 13, wherein the tactile feedback intensity is proportional to the level of the facial expression.

16. The method of claim 13, wherein the tactile feedback includes at least one of vibrations, air puffs, and pressure.

17. The method of claim 13, further comprising
determining a tactile feedback pattern of the tactile feedback device based on the type of the facial expression.

18. The method of claim 17, wherein the tactile feedback pattern includes a tactile feedback pattern corresponding to Morse code.

* * * * *

UNITED STATES PATENT AND TRADEMARK OFFICE
CERTIFICATE OF CORRECTION

PATENT NO. : 11,482,132 B2
APPLICATION NO. : 15/421912
DATED : October 25, 2022
INVENTOR(S) : Carlo Cruz It is certified that error appears in the above-identified patent and that said Letters Patent is hereby corrected as shown below:

On the Title Page

Column 2, item (56), U.S. patent documents, cite No. 1, delete "Lindhal" and insert -- Lindhal et al. --, therefor.

In page 2, Column 1, item (56), U.S. patent documents, cite No. 5, delete "Talbolt" and insert -- Talbolt et al. --, therefor.

In page 2, Column 1, item (56), U.S. patent documents, cite No. 6, delete "Berman" and insert -- Berman et al. --, therefor.

In page 2, Column 2, item (56), other publications, cite No. 2, delete "iFeeding" and insert -- iFeeling --, therefor.

Signed and Sealed this
Fourteenth Day of February, 2023

Katherine Kelly Vidal
*Director of the United States Patent and Trademark Office*